United States Patent [19]

Dinter

[11] 4,335,408
[45] Jun. 15, 1982

[54] DIGITAL TRACKING SYSTEM

[75] Inventor: Konrad M. Dinter, Lawrenceville, N.J.

[73] Assignee: RCA Corporation, New York, N.Y.

[21] Appl. No.: 153,969

[22] Filed: May 28, 1980

[30] Foreign Application Priority Data

Apr. 8, 1980 [GB] United Kingdom ................ 8011560

[51] Int. Cl.³ ............................................. G11B 21/10
[52] U.S. Cl. ......................................... 360/77; 360/75
[58] Field of Search ...................... 360/77, 75, 78, 70, 360/10–11, 84, 73, 77, 69

[56] References Cited

U.S. PATENT DOCUMENTS

| 3,789,378 | 1/1974 | Bonzano et al. | 360/77 |
| 4,021,857 | 5/1977 | Tanimura | 360/84 |
| 4,139,872 | 2/1979 | Tachi | 360/10 X |
| 4,163,993 | 8/1979 | Ravizza | 360/10 |

*Primary Examiner*—John H. Wolff
*Attorney, Agent, or Firm*—Paul J. Rasmussen; William H. Meise; Henry I. Steckler

[57] ABSTRACT

A tracking system for a VTR features digital circuitry, such as a counter, for immunity to component tolerances and power supply voltage shifts. It also allows holding a constant control voltage when desired. A tachometer input signal need not be converted to an analog one, which eliminates A/D converter failure problems.

17 Claims, 3 Drawing Figures

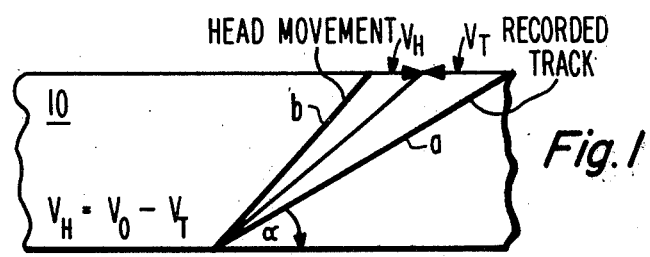
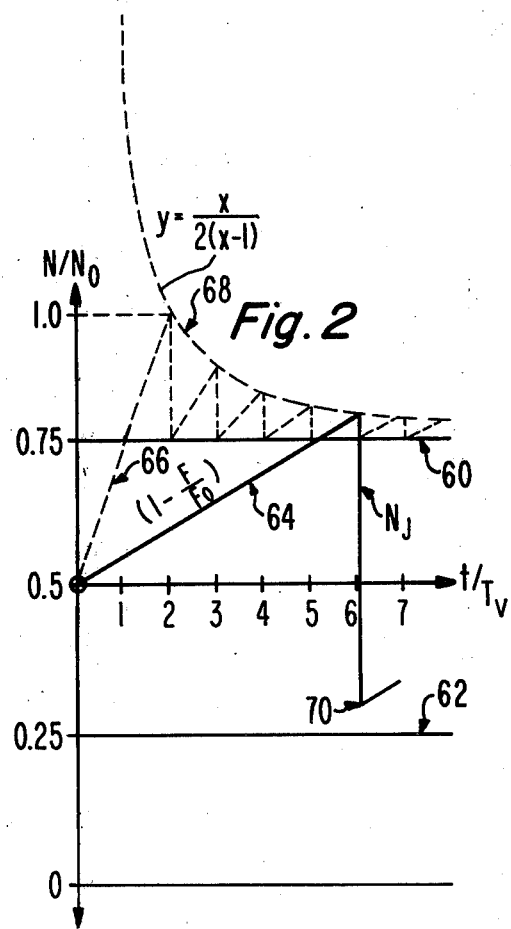

DIGITAL TRACKING SYSTEM

BACKGROUND OF THE INVENTION

The present invention relates to a system for maintaining a playback head on a recorded track, and more particularly, to such a system that has playback speeds other than the recording speed.

The purpose of tracking systems, especially the present digital tracking system, is to develop a control voltage for, e.g., a bimorph crystal on which the playback head of the video tape machine is mounted, especially a helical scan video tape machine, so that even with abnormal playback speeds including standstill, i.e., other than the recording speed, the playback head stays on the video track. Before the system is described in detail, the basic requirements are explained in FIG. 1.

A track recorded on a portion of tape 10 is shown designated with the letter a. This recorded track has a certain angle $\alpha$ with respect to the lower edge of the tape. The angle is a result of two movements. One movement is the rotational movement of the headwheel containing the head in the drum, and the other movement is the transverse movement of tape 10 pulled by the capstan motor while the drum is rotating. If the tape 10 is considered as standing still, the head in the drum would describe a line across the tape shown with the letter b. By moving the tape 10 from the right to the left side during the rotating head scan with the normal recording speed, the head exactly reads the recorded track a. If the tape 10 stands still and the drum with the reading head rotates, the head moves with respect to the tape according to line b. Therefore, to read out the recorded track when the tape is not moving, such as when it is desired to view a stop motion picture, the head has to be moved transverse with respect to the recorded track a in addition to its movement due to the drum rotation represented by b. In general, if the tape is moving at a tape speed $V_t$, the head has to move with a velocity $V_h$ in the proper direction to scan the recorded track. The proper direction is against the tape movement as long as the tape speed is lower than the normal speed at which the tape was recorded. The head movement has to be in the direction of the tape movement as soon as the tape speed is higher than the normal tape speed at which the tape was recorded. The formula for the head speed required is $V_h = V_o - V_t$, wherein $V_o$ is the normal recording tape speed and $V_t$ is the actual playback tape speed. This equation may be rewritten as $V_h/V_o = 1 - V_t/V_o$; this is equal to $1 - F/F_o$, wherein F is the number of fields scanned per second, which is proportional to the tape speed, and $F_o$ is the nominal number of fields scanned per second, which is about 60 per second in an NTSC system.

To make the head move with the velocity $V_h$, one has to apply a ramp voltage waveform to the bimorph supporting the playback head. The slope of this ramp function must be $1 - F/F_o$. It will be understood that for normal speed where $F = F_o$, there is no need to apply a ramp waveform to the bimorph.

In existing systems this ramp waveform is generated using analog techniques, such as shown in U.S. Pat. No. 4,163,993. However, such a system is subject to component tolerances and power supply changes which result in unreliable operation. Further, during certan times, such as when the speed is changed or when the recorder is playing at normal speeds, it is desired to hold the ramp voltage constant. This is difficult with an analog system, which is subject to voltage drift. Still further, it is necessary to convert a tachometer digital output signal to an analog signal. The required converter is subject to failure. All of the above results in limited accuracy and stability.

SUMMARY OF THE INVENTION

A tachometer is used to derive the tape speed for high accuracy. Its output signal is compared to a reference signal, and a control signal for a playback head is generated from said comparison by a digital counter. The decision when to jump back is derived by comparison in a digital comparator between the count in the counter and a certain fixed number which represents the amplitude of the bending of the bimorph.

DESCRIPTION OF THE DRAWINGS

FIG. 1 is a portion of recorded tape with head tracks thereon;

FIG. 2 is a graph of the mathematical structure of a ramp function; and

DETAILED DESCRIPTION

Figure 3:
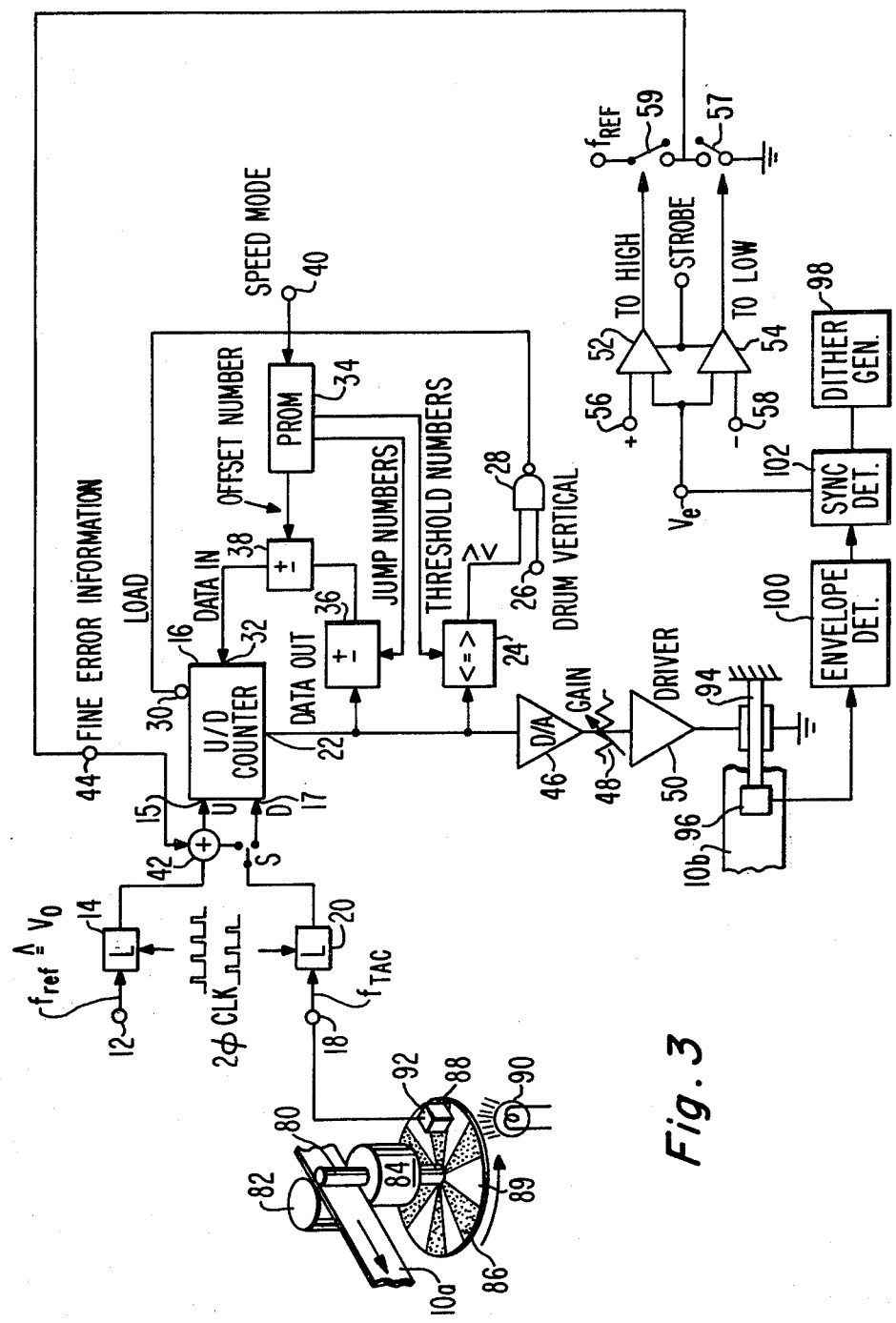
FIG. 3 is a system block diagram of a tracking system in accordance with the invention.

FIG. 2 shows a graph from which it can be understood how the ramp voltage waveform that controls the bimorph and a cyclic variation that it undergoes can be mathematically deduced. The horizontal axis represents time in terms of vertical periods. Therefore a vertical synchronization pulse occurs at every vertical period number. The vertical axis represents numbers from a counter, normalized with respect to the maximum possible count, $N_o$, of the counter, that will be converted to an analog signal applied to a bimorph. The normalized number 0.5 represents the undeflected or middle position of the bimorph, while the normalized numbers 0 and 1.0 represent selected maximum allowable deflections of the bimorph. There are additional horizontal lines 60 and 62 which represent threshold numbers. The threshold 60 at the normalized value of 0.75 is for positive going slopes, while the threshold 62 at the normalized value of 0.25 is for negative going slopes. As soon as the current counter number representing the ramp exceeds the applicable threshold number, the next vertical pulse makes the ramp, and therefore the bimorph, jump back a fixed amount which is proportional to the geometric distance between two adjacent tracks on the tape and is independent of tape speed. After the jump, the ramp starts with the same slope again as long as the speed chosen is not changed. For example, if the desired tape speed is 57 fields per second, then the normalized ramp slope must be $1 - 57/60 = 0.05$. A ramp with this slope is shown as line 64, which exceeds threshold 60 after five fields. The occurrence of the sixth vertical synchronization pulse causes a subtraction from whatever number is in the counter of a number $N_J$, which corresponds to the difference between two adjacent tracks. If the desired number of fields per second exceeds 60, then the ramp slope is negative and the lower threshold 62 is applicable to effect the reloading, but now by adding $N_J$. The greatest deviation of the bimorph happens when the desired number of fields per second is 45 or lower. Then the ramp function 66 reaches the threshold 60 immediately after one field and the counter is reloaded at the end of the next field. The counter therefore reaches double the difference between the threshold number and the undeviated number of 0.5 in this case. Since 1.0 represents maximum deviation, threshold 60 is set to 0.75. For speeds greater than 75 fields per second, the slope is maximum in the negative direction, and the ramp function reaches zero, and therefore threshold 62 is set to 0.25. The curve 68 represents the locus of maximum numbers of different ramps at different speeds. The normalized ramp slope is determined by the difference between nominal and actual tape speed as given in the expression $1-F/F_o$.

FIG. 3 shows a block diagram of a digital tracking system in accordance with the invention. Starting at the left, the input 12 of the latch 14 receives a reference frequency signal and applies it to the up input 15 of the up/down counter 16. The frequency of the reference signal is 102 times the frequency of the vertical synchronization signal. Tape 10a is driven by a capstan 80 acting against a pinch roller 82. Capstan motor 84 drives capstan 80 and has secured to it a tachometer disc 86 having 102 dark sectors 88 and 102 transparent sectors 89 therearound. Light source 90 emits light, and 102 times per revolution of disc 86, transparent sectors 89 allow light to impinge on photodetector 92 which supplies a digital tachometer output signal. The capstan tachometer signal is received at input 18 and is fed to a latch 20 and then to the down input 17 of counter 16. A two phase clock (not shown) clocks the signals in the two latches 14 and 20 out one after the other. This ensures that the up and down inputs 15 and 17 of the up/down counter 16 do not become active at the same time, which would be an invalid situation. The output data of the up/down counter 16 at output 22 represents in digital form the ramp in accordance with the actual speed. PROM 34 is addressed by a speed address signal from a control unit (not shown) at input 40. The speed address signal is a nine bit parallel signal, one bit indicating tape speed direction. It is determined by manual entry of the VTR operator. PROM 34 supplies the jump numbers $N_J$, which value depends on the speed chosen, to adder/subtractor 36, threshold numbers 60 and 62 to comparator 24, and an offset number to adder/subtractor 38, which offset number ensures that the bimorph has equal amplitude deviations from its undeviated center position. The data output are therefore corrected by the jump number and the offset number by adder/subtractors 36 and 38 respectively and so corrected are present at data input 32. As soon as the output number exceeds or goes below threshold level 60 or 62 respectively, a comparator 24 delivers an output signal to NAND gate 28 which indicates that its input is larger or smaller respectively than the appropriate threshold level. Headwheel drum (not shown) vertical synchronization pulses are applied to input 26. These pulses occur once per revolution of the headwheel since one field is recorded per headwheel revolution. Gate 28 loads the up/down counter 16 with the "data in" data present at input 32 by applying a load command signal at input 30. As soon as the "data in" data are loaded into the up/down counter 16, the output signal at output 22 again represents a new ramp starting number, such as 70 in FIG. 2.

The data out pulses are converted to an analog ramp signal by D/A converter 46, gain controlled by control 48, amplified by driver 50, and then applied to the cantilever mounted bimorph 94 located on a headwheel (not shown). A playback head 96 is located at the free end of bimorph 94 in contact with tape 10b. Tape 10a and 10b are the same continuous tape, their interconnection has been omitted for the sake of clarity.

The up input 15 also has an adder 42 in its input path. This adder 42 has two functions. First, as soon as tape motion is reversed, the capstan tachometer frequency signal must not be subtracted from the reference frequency signal but added. Digitally, this is done by switching from down to up counting. This is accomplished by switch S, which is controlled by the mode address signals at input 40.

Second, adder 42 has an input 44 for receiving digital fine error information. A fine error analog voltage is derived by known circuitry which can include a dithering generator 98 and an envelope detector 100, which detects the dither frequency in the envelope of the played back FM signal from head 96. The detected dither frequency signal is applied to synchronous detector 102 and compared with a reference dither signal from generator 98, to produce the fine analog error voltage, $V_e$. This error voltage, which can be positive or negative according to the side of the track at which the head is moving, is applied to two voltage comparators 52 and 54, which have positive and negative thresholds as determined by voltages present at terminals 56 and 58 respectively. They are strobed by the same clock frequency signal as applied to latches 14 and 20, but with a phase different from both. Comparators 52 and 54 determine whether additional pulses are fed by closing switch 59 to adder 42 or several count pulses are inhibited by closing switch 57 from going through the adder 42 to the up input 15 of counter 16. The slope is steeper or slower for a short time in comparison to the normal slope. This results in a parallel offset of the head on the tape, which brings the analog error voltage down below an allowed tolerance threshold, which indicates that the head is on track.

What is claimed is:

1. A method for generating a playback head position control signal, said method comprising measuring the playback speed of a record prerecorded at a nominal speed by using a tachometer coupled to a means for driving said record, comparing said measured speed to a reference signal having a frequency in accordance with said nominal record speed by counting in a first direction in accordance with the frequency of the signal from said tachometer, and counting in a second opposing direction in accordance with said reference signal frequency, and producing said control signal in accordance with said comparison.

2. A method as claimed in claim 1 wherein said first and second directions comprise up and down respectively.

3. A method as claimed in claim 1 wherein said second recited counting step comprises changing counts in accordance with fine playback head error information.

4. A method as claimed in claim 1 wherein said comparing step further comprises loading data to form loaded data for said counting steps.

5. A method as claimed in claim 4 wherein said loaded data comprises a jump number in accordance with said playback speed.

6. A method as claimed in claim 4 wherein said loaded data comprises an offset number to ensure equal head deviation in either direction from a center position.

7. A method as claimed in claim 4 wherein said loading step occurs after said control signal crosses a threshold number and a vertical synchronization pulse next occurs.

8. A method as claimed in claim 1 wherein said producing step comprises digital to analog converting the results of said comparison step.

9. An apparatus for generating a playback head position control signal, said apparatus comprising means for measuring the playback speed of a record prerecorded at a nominal speed including a tachometer coupled to a means for driving said record, means for comparing said measured speed to a reference signal having a frequency in accordance with said nominal record speed, said comparing means including means for counting in a first direction in accordance with the frequency of the signal from said tachometer and for counting in a second opposing direction in accordance with said reference signal frequency, and means for producing said control signal in accordance with said comparison.

10. An apparatus as claimed in claim 9 wherein said first and second directions comprise up and down respectively.

11. An apparatus as claimed in claim 9 wherein said counting means comprises means for changing counts counted in said second direction in accordance with fine playback head error information.

12. An apparatus as claimed in claim 9 wherein said comparing means further comprises means for loading data into said counting means to form loaded data.

13. An apparatus as claimed in claim 12 wherein said loaded data comprises a jump number in accordance with said playback speed.

14. An apparatus as claimed in claim 12 wherein said loaded data comprises an offset number to ensure equal head deviation in either direction from a center position.

15. An apparatus as claimed in claim 12 wherein said loading means is actuated after said control signal crosses a threshold number and a vertical synchronization pulse next occurs.

16. An apparatus as claimed in claim 9 wherein said producing means comprises a digital to analog converter.

17. An apparatus as claimed in claim 9 wherein the head produces a dither frequency signal and further comprising means for producing an analog fine error voltage signal from said dither frequency signal, and means for converting said analog signal to a digital fine error information signal including a plurality of voltage comparators.

* * * * *